US005633590A

United States Patent [19]
Vail, III

[11] Patent Number: 5,633,590
[45] Date of Patent: May 27, 1997

[54] FORMATION RESISTIVITY MEASUREMENTS FROM WITHIN A CASED WELL USED TO QUANTITATIVELY DETERMINE THE AMOUNT OF OIL AND GAS PRESENT

[75] Inventor: William B. Vail, III, Bothell, Wash.

[73] Assignee: ParaMagnetic Logging, Inc., Woodinville, Wash.

[21] Appl. No.: 214,648

[22] Filed: Mar. 17, 1994

Related U.S. Application Data

[63] Continuation-in-part of Ser. No. 83,615, Jun. 28, 1993, Pat. No. 5,570,024, which is a continuation-in-part of Ser. No. 754,965, Sep. 4, 1991, Pat. No. 5,223,794, which is a division of Ser. No. 434,886, Nov. 13, 1989, Pat. No. 5,075,626, which is a continuation-in-part of Ser. No. 89,697, Aug. 26, 1987, Pat. No. 4,882,542, which is a continuation-in-part of Ser. No. 927,115, Nov. 4, 1986, Pat. No. 4,820,989.

[51] Int. Cl.$^6$ ................................................. G01V 3/20
[52] U.S. Cl. .................................... 324/368; 324/369
[58] Field of Search .............................. 324/368, 369, 324/370, 354–358, 366, 373; 364/422; 340/854.3, 854.5

[56] References Cited

U.S. PATENT DOCUMENTS

| | | |
|---|---|---|
| 2,729,784 | 1/1956 | Fearon .................................... 324/368 |
| 2,891,215 | 6/1959 | Fearon .................................... 324/368 |
| 4,796,186 | 1/1989 | Kaufman ................................. 324/368 |
| 4,820,989 | 4/1989 | Vail, III .................................... 324/368 |
| 4,837,518 | 6/1989 | Gard et al. ............................. 324/368 |
| 4,882,542 | 11/1989 | Vail, III .................................... 324/368 |
| 5,043,668 | 8/1991 | Vail, III .................................... 324/368 |
| 5,043,669 | 8/1991 | Vail, III .................................... 324/368 |
| 5,075,626 | 12/1991 | Vail, III .................................... 324/368 |
| 5,187,440 | 2/1993 | Vail, III .................................... 324/372 |
| 5,223,794 | 6/1993 | Vail, III .................................... 324/368 |

FOREIGN PATENT DOCUMENTS

| | | |
|---|---|---|
| 0618463 | of 1994 | European Pat. Off. . |
| 2207278 | 11/1972 | France . |
| 56026 | 11/1939 | U.S.S.R. . |

OTHER PUBLICATIONS

Vail et al., "Formation Resistivity Measurement Through Metal Casing" SPWLA 34th Annual Logging Symposium, Jun. 13–16, 1993, pp. 1–12.
Tabarovsky et al, "Through–casing Resistivity (TCR): Physics, Resolution and 3–D effects", SPWLA, 35th Annual Logging Symposium, Jun. 19–22, 1994.
Singer et al, "Through–Casing Resistivity: 2D and 3–D Distortions and Correction Techniques", SPWLA 36th Annual Logging Symposium, Jun. 26–29, 1995.
Vail et al., "Formation Resistivity Measurements Through Metal Casing at the MWX-2 Well in Rifle, Colorado", SPWLA, 36th Annual Logging Symposium, Jun. 26–29, 1995.
"New Breakthrough Device Finds Untapped Oil Reserves in Old Wells", (Pub.) PML, Inc, Apr. 27, 1995.
Klein et al., "Cement Resistivity and Implications for Measurement of Formation Resistivity Through Casing", SPE, 26453, 1993, pp. 365–380.
"Small Company's Novel Idea for Oil, Gas Producers Becoming Government–Industry R&D Success Stroy", Dept. of Energy, Apr. 28, 1995.
"Rotary Drilling", Petroleum Extension Service, Unit II, Lesson 4; Unit I: lesson 3; Unit I, lesson I.
"Wireline Logging Tool Catalog", Gulf Publishing Co., 1986.
John T. Dewan, "Essentials of Modern Open–Hole Log Interpretation", pp. 6,31.
Maute, Robert E., "Electrical Logging: State–of–the–Art", The Log Analyst, vol. 33, No. 3, May–Jun., 1992, pp. 212–213.
Schemph, F. Jay, "Through–casing resistivity tool set for Permian use", Improved Recovery Week, vol. 1, No. 32, Sep. 28, 1992, pp. 1,4, and 6.
Marmedov, et al., "Effectiveness of Resistivity Logging of Cased Wells by a Six–Electrode Tool" IZV-.VYSSH.UCHEB, ZAVEDENII, NEFT GAZ No. 7, Jul. 1987, pp. 11–15 (ISSN 0445–0108). Unofficial English translation stapled in front of original Russian Text.
Schlumberger, "Log Interpretation Charts", 1991, pp. 4–5.
Schlumberger, "Cased Hole Log Interpretation, Principles/Applications", 1989, entire book.
Vail, et al., "Through Casing Resistivity Measurements and Their Interpretation for Hydrocarbon Saturations", SPE Paper 30582, SPE Annual Technical Conference & Exhibition, Oct. 22–26, 1995, pp. 533–548.
Vail, et al., "Through Casing Resistivity Tool™ To Locate Bypassed Oil", The American Oil & Gas Reporter, Oct. 1995, pp. 70–76.
LeLeux, David E., "Through–casing electrical log can locate bypassed reserves", World Oil, Nov. 1995, reprint pp. 1–4.

Primary Examiner—Sandra L. O'Shea
Assistant Examiner—Jay M. Patidar

[57] ABSTRACT

Methods to quantitatively determine the separate amounts of oil and gas in a geological formation adjacent to a cased well using measurements of formation resistivity are disclosed. The steps include obtaining resistivity measurements from within a cased well of a given formation, obtaining the porosity, obtaining the resistivity of formation water present, computing the combined amounts of oil and gas present using Archie's Equations, determining the relative amounts of oil and gas present from measurements within a cased well, and then quantitatively determining the separate amounts of oil and gas present in the formation.

10 Claims, 7 Drawing Sheets

FORMATION RESISTIVITY MEASUREMENTS FROM WITHIN A CASED WELL USED TO QUANTITATIVELY DETERMINE THE AMOUNT OF OIL AND GAS PRESENT

This invention was made with Government support under DOE Grant No. DE-FG06-84ER13294, entitled "Validating the Paramagnetic Logging Effect", Office of Basic Energy Sciences, of the U.S. Department of Energy. The government has certain rights in this invention. The basic concept for the invention described herein was conceived during the funding provided by the above grant.

Ongoing research to measure resistivity through casing has been provided on a co-funded basis from: (a) U.S. Department of Energy Grant No. DE-FG19-88BC14243 entitled "Proof of Feasibility of Thru Casing Resistivity Technology"; (b) U.S. Department of Energy (DOE) Grant No. DE-FG22-90BC14617 entitled "Proof of Concept of Moving Thru Casing Resistivity Apparatus"; (c) U.S. Department of Energy Grant No. DE-FG22-93BC14966 entitled "Fabrication and Downhole Testing of Moving Through Casing Resistivity Apparatus"; and (d) Gas Research Institute (GRI) Contract No. 5088-212-1664 entitled "Proof of Feasibility of the Through Casing Resistivity Technology". The government and the GRI have certain rights in this invention. The application herein was filed during periods of time funded by (a) and (b) and (c) above.

CROSS-REFERENCES TO RELATED APPLICATIONS

This application is a Continuation-in-Part Application of an earlier, and still pending, Continuation-in-Part Application that is entitled "Multiple Electrode Apparatus Compensating for Casing Resistance Differences to Measure Formation Resistivity from Within a Cased Borehole"; which is Ser. No. 08/083,615; and which has a filing date of Jun. 28, 1993 now U.S. Pat. No. 5,570,024. A copy of Ser. No. 08/083,615 is included herein by reference.

Ser. No. 08/083,615 is a Continuation-in-Part Application of an earlier Divisional Application that is entitled "Methods of Operation of Apparatus Measuring Formation Resistivity From Within A Cased Well Having One Measurement and Two Compensation Steps"; which is Ser. No. 07/754,965; which has a filing date of Sep. 4, 1991; and that issued on Jun. 29, 1993 as U.S. Pat. No. 5,223,794 {"Vail(794)"}. A copy of Ser. No. 07/754,965 is included herein by reference.

Ser. No. 07/754,965 is a Divisional Application of an earlier Continuation-in-Part Application that is entitled "Electronic Measurement Apparatus Movable In A Cased Borehole and Compensating for Casing Resistance Differences"; which is Ser. No. 07/434,886; which has a filing date of Nov. 13, 1989; and which issued on Dec. 24, 1991 as U.S. Pat. No. 5,075,626 {"Vail(626)"}. Ser. No. 07/434,886 is included herein by reference.

Ser. No. 07/434,886 is a Continuation-in-Part Application of an earlier Continuation-in-Part Application having the title of "Methods and Apparatus for Measurement of Electronic Properties of Geological Formations Through Borehole Casing"; which is Ser. No. 07/089,697; which has the Filing Date of Aug. 26, 1987; and which issued on Nov. 21, 1989 as U.S. Pat. No. 4,882,542 {"Vail(542)"}. A copy of Ser. No. 07/089,697 is included herein by reference.

Ser. No. 07/089,697 is a Continuation-in-Part Application of the original Parent Application having the title "Methods and Apparatus for Measurement of the Resistivity of Geological Formations from Within Cased Boreholes"; which is Ser. No. 06/927,115; which has the Filing Date of Nov. 4, 1986; and which issued on Apr. 11, 1989 as U.S. Pat. No. 4,820,989 {"Vail(989)"}. A copy of Ser. No. 06/927,115 is included herein by reference.

BACKGROUND OF THE INVENTION

1. Field of the Invention

The field of the invention relates to improved methods of measurement to quantitatively determine the amount of oil and gas present from within a cased well disposed in geological formation in the earth. The field of the further invention relates to methods of measurement that may be used from within an old cased well in an existing oil reservoir; from within an old cased well in an existing gas reservoir; from within steel pipe attached to a drilling bit during drilling operations in a formation; or from within a new casing or pipe inserted into the earth for any reason.

2. Description of Prior Art

The oil industry has long sought to measure resistivity through casing. Such resistivity measurements, and measurements of other electrochemical phenomena, are useful for at least the following purposes: locating bypassed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject in the oil industry. Many U.S. patents have issued in the pertinent Subclass 368 of Class 324 of the United States Patent and Trademark Office which address this subject. The following presents a brief description of the particularly relevant prior art presented in the order of descending relative importance.

U.S. patents which have already issued to the inventor in this field are listed as follows: U.S. Pat. No. 4,820,989 (Ser. No. 06/927,115); U.S. Pat. No. 4,882,542 (Ser. No. 07/089,697); U.S. Pat. No. 5,043,668 (Ser. No. 07/435,273); U.S. Pat. No. 5,043,669 (Ser. No. 07/438,268); U.S. Pat. No. 5,075,626 (Ser. No. 07/434,886); U.S. Pat. No. 5,187,440 (Ser. No. 07/749,136); and U.S. Pat. No. 5,223,794 (Ser. No. 07/754,96). These seven U.S. Patents are collectively identified as "the Vail Patents" herein.

The apparatus and methods of operation herein disclosed are embodiments of the Through Casing Resistivity Tool™ that is abbreviated TCRT®. The Through Casing Resistivity Tool™ and TCRT® are Trademarks of ParaMagnetic Logging, Inc. in the United States Patent and Trademark Office. ParaMagnetic Logging, Inc. has its principal place of business located at 18730 - 142nd Avenue N.E., Woodinville, Wash., 98072, USA, having the following telephone number: (206) 481-5474.

An important paper concerning the Through Casing Resistivity Tool was published recently. Please refer to the article entitled "Formation Resistivity Measurements Through Metal Casing", having authors of W. B. Vail, S. T. Momii of ParaMagnetic Logging, Inc., R. Woodhouse of Petroleum and Earth Science Consulting, M. Alberty and R. C. A. Peveraro of BP Exploration, and J. D. Klein of ARCO Exploration and Production Technology which appeared as Paper "F", Volume I, in the *Transactions of the SPWLA Thirty-Fourth Annual Logging Symposium*, Calgary, Alberta, Canada, Jun. 13–16, 1993, sponsored by The Society of Professional Well Log Analysts, Inc. of Houston, Tex.

and the Canadian Well Logging Society of Calgary, Alberta, Canada (13 pages of text and 8 additional figures). Experimental results are presented therein which confirm that the apparatus and methods disclosed in Ser. No. 07/434,886 that is U.S. Pat. No. 5,075,626 actually work in practice to measure the resistivity of geological formations adjacent to cased wells. To the author's knowledge, the SPWLA paper presents the first accurate measurements of resistivity obtained from within cased wells using any previous experimental apparatus.

Other recent articles appearing in various publications concerning the Through Casing Resistivity Tool and/or the Vail Patents include the following: (A) in an article entitled "Electrical Logging: State-of-the-Art" by Robert Maute of the Mobil Research and Development Corporation, in *The Log Analyst*, Vol. 33, No. 3, May–June 1992 page 212–213; and (B) in an article entitled "Through Casing Resistivity Tool Set for Permian Use" in *Improved Recovery Week*, Volume 1, No. 32, Sep. 28, 1992.

The inventor made a verbal presentation entitled "Introduction to the Through Casing Resistivity Tool" to the Permian Basin Well Logging Society on Mar. 18, 1993 that first publicly presented a portion of the inventive material herein.

The Vail Patents describe the various embodiments of the Through Casing Resistivity Tool ("TCRT"). Many of these Vail Patents describe embodiments of apparatus having three or more spaced apart voltage measurement electrodes which engage the interior of the casing, and which also have calibration means to calibrate for thickness variations of the casing and for errors in the placements of the voltage measurement electrodes.

U.S. Pat. No. 4,796,186 which issued on Jan. 3, 1989 to Alexander A. Kaufman entitled "Conductivity Determination in a Formation Having a Cased Well" also describes apparatus having three or more spaced apart voltage measurement electrodes which engage the interior of the casing and which also have calibration means to calibrate for thickness variations in the casing and for errors in the placements of the electrodes. This patent has been assigned to, and is owned by, ParaMagnetic Logging, Inc. of Woodinville, Wash. In general, different methods of operation and analysis are described in the Kaufman Patent compared to the Vail Patents cited above.

U.S. Pat. No. 4,837,518 which issued on Jun. 6, 1989 to Michael F. Gard, John E. E. Kingman, and James D. Klein, assigned to the Atlantic Richfield Company, entitled "Method and Apparatus for Measuring the Electrical Resistivity of Geologic Formations Through Metal Drill Pipe or Casing", predominantly describes two voltage measurement electrodes and several other current introducing electrodes disposed vertically within a cased well which electrically engage the wall of the casing, henceforth referenced as "Gard (518)". However, that patent does not describe an apparatus having three spaced apart voltage measurement electrodes and associated electronics which takes the voltage differential between two pairs of the three spaced apart voltage measurement electrodes to directly measure electronic properties adjacent to formations. Nor does Gard (518) describe an apparatus having at least three spaced apart voltage measurement electrodes wherein the voltage drops across adjacent pairs of the spaced apart voltage measurement electrodes are simultaneously measured to directly measure electronic properties adjacent to formations. Therefore, the Card (518) does not describe the methods and apparatus disclosed in the Vail Patents.

USSR Patent No. 56,026, which issued on Nov. 30, 1939 to L. M. Alpin, henceforth called "Alpin (026)", which is entitled "Process of the Electrical Measurement of Well Casings", describes an apparatus which has three spaced apart voltage measurement electrodes which positively engage the interior of the casing. However, Alpin (026) does not have suitable calibration means to calibrate for thickness variations of the casing nor for errors related to the placements of the voltage measurement electrodes. Therefore, Alpin (026) does not describe the methods and apparatus disclosed in the Vail Patents.

French Patent No. 2,207,278 having a "Date of Deposit" of Nov. 20, 1972 describes apparatus having four spaced apart voltage measurement electrodes which engage the interior of borehole casing respectively defined as electrodes M, N, K, and L. Various uphole and downhole current introducing electrodes are described. Apparatus and methods of operation are provided that determines the average resistance between electrodes M and L. French Patent No. 2,207,278 further explicitly assumes an exponential current flow along the casing. Voltage measurements across pair MN and KL are then used to infer certain geological parameters from the assumed exponential current flow along the casing. However, French Patent No. 2,207,278 does not teach measuring a first casing resistance between electrodes MN, does not teach measuring a second casing resistance between electrodes NK, and does not teach measuring a third casing resistance between electrodes KL. Various preferred embodiments described in the Vail Patents teach that it is of importance to measure said first, second, and third resistances to compensate current leakage measurements for casing thickness variations and for errors in placements of the voltage measurement electrodes along the casing to provide accurate measurements of current leakage into formation. Further, many embodiments of the Vail Patents do not require any assumption of the form of current flow along the casing to measure current leakage into formation. Therefore, for these reasons alone, French Patent No. 2,207,278 does not describe the methods and apparatus disclosed herein. There are many other differences between various embodiments of the Vail Patents and French Patent No. 2,207,278 which are described in great detail in the Statement of Prior Art for Ser. No. 07/754,965 dated Dec. 2, 1991 that issued as U.S. Pat. No. 5,223,794 on Jun. 29, 1993.

An abstract of an article entitled "Effectiveness of Resistivity Logging of Cased Wells by A Six-Electrode Tool." by N. V. Mamedov was referenced in TULSA ABSTRACTS as follows: "IZV.VYSSH.UCHEB, ZAVEDENII, NEFT GAZ no.7, pp. 11–15, July 1987. (ISSN 0445-0108; 5 refs; in Russian)", hereinafter the "Mamedov (1987)". It is the applicant's understanding from an English translation of that Mamedov (1987) that the article itself mathematically predicts the sensitivity of the type tool described in the above defined French Patent No. 2,207,278. Mamedov (1987) states that the tool described in French Patent No. 2,207,278 will only be show a "weak dependence" on the resistivity of rock adjacent to the cased well. By contrast, many embodiments of the Vail Patents, and the invention herein, provide measurements of leakage current and other parameters which are strongly dependent upon the resistivity of the rock adjacent to the cased well. Therefore, Mamedov (1987) does not describe the methods of measurement described herein.

U.S. Pat. No. 2,729,784, issued on Jan. 3, 1956 having the title of "Method and Apparatus for Electric Well Logging", and U.S. Pat. No. 2,891,215, issued on Jun. 16, 1959 having the title of "Method and Apparatus for Electric Well Logging", both of which issued in the name of Robert E.

Fearon, henceforth called the "Fearon Patents", describe apparatus also having two pairs of voltage measurement electrodes which engage the interior of the casing. However, an attempt is made in the Fearon Patents to produce a "virtual electrode" on the casing in an attempt to measure leakage current into formation which provides for methods and apparatus which are unrelated to the Kaufman and Vail Patents cited above. The Fearon Patents neither provide calibration means, nor do they provide methods similar to those described in either the Kaufman Patent or the Vail Patents, to calibrate for thickness variations and errors in the placements of the electrodes. Therefore, the Fearon Patents do not describe the methods and apparatus disclosed herein.

SUMMARY OF THE INVENTION

Accordingly, an object of the invention is to provide new methods of operation and new methods of geophysical analysis to quantitatively measure the amount of oil and gas from within metal pipes located in geological formations.

It is further another object of the invention to provide new methods of operation and new methods of geophysical analysis to quantitatively measure the amount of oil and gas from within metal pipes that may be attached to drill bits located in geological formations.

DESCRIPTION OF THE PREFERRED EMBODIMENTS

The invention is described in three major different portions of the specification. In the first major portion of the specification, relevant parts of the text in Ser. No. 07/089,697 {Vail(542)} are repeated herein which describe apparatus defined in FIGS. 1, 3, 4, and 5. The second major portion of the specification quotes relevant parts of Ser. No. 07/434,886 {Vail(626)} that describe the apparatus defined in FIG. 6. The third major portion of the specification herein is concerned with providing new methods of operation and new methods of geophysical analysis to quantitatively determine the amount of oil and gas adjacent to steel pipe or cased well located in a geological formation.

Figure 1:
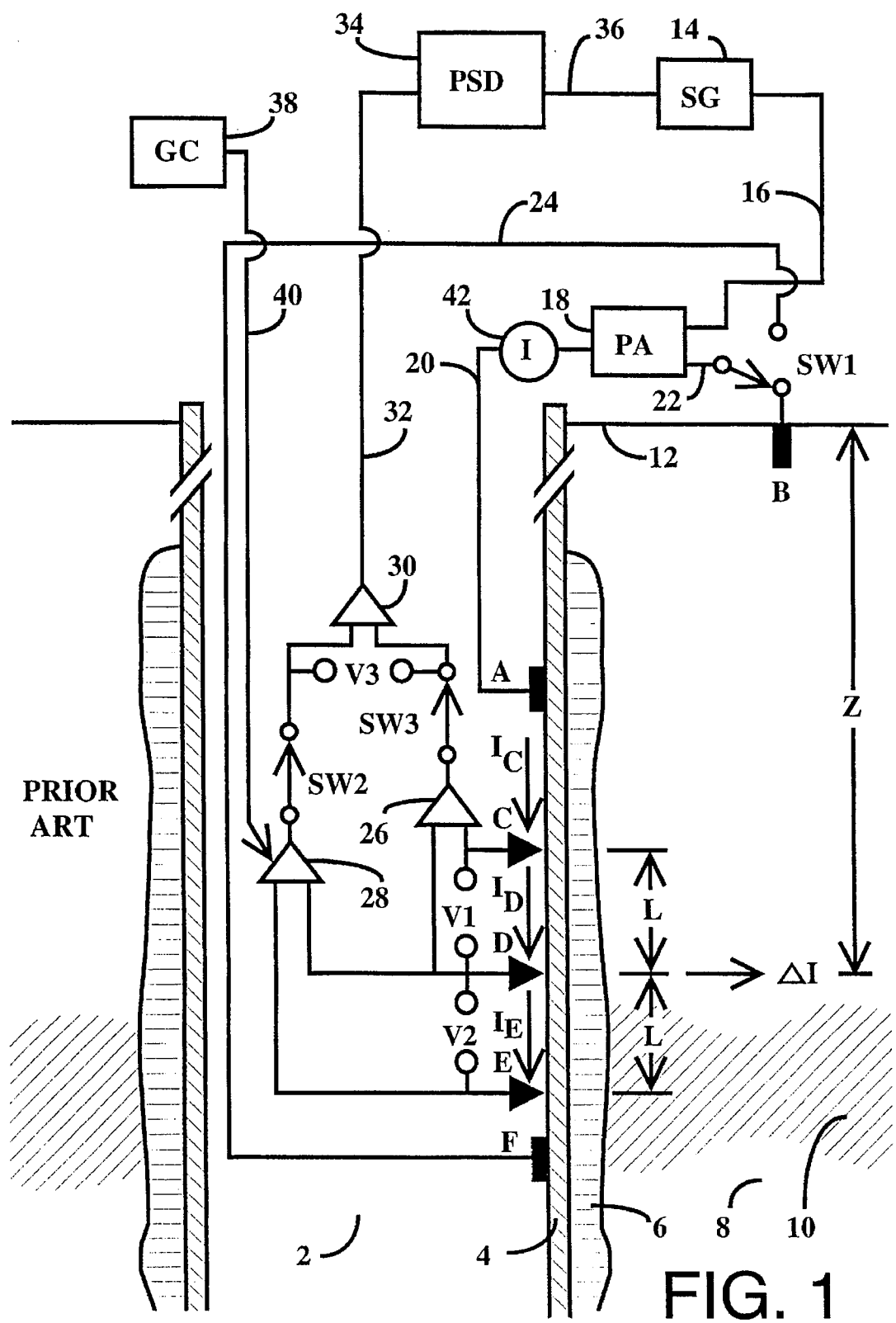
FIG. 1 is a sectional view of one preferred embodiment of the invention of the Through Casing Resistivity Tool (TCRT) which is marked with the legend "Prior Art".

From a technical drafting point of view, FIGS. 1, 2, 3, 4, and 5 in Ser. No. 07/089,697 {Vail(542)} and in those contained in this application are nearly identical. However, the new drawings have been re-done using computer graphics. The following excerpt is taken word-for-word from Ser. No. 07/089,697:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is ½ the peak-to-peak value of the sine wave.)

In general, with SW1 connected to electrode B, current is conducted through formation. For example, current $\Delta I$ is conducted into formation along the length 2L between electrodes C and E. However, if SW1 is connected to cable 24 and subsequently to electrode F, then no current is conducted through formation to electrode B. In this case, $I_C=I_D=I_E$ since essentially little current $\Delta I$ is conducted into formation.

It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead." These lengths are respectively called "Characteristic Lengths" appropriate for the average resistivity of the formation and the type of casing used. A Characteristic Length is related to the specific length of casing necessary for conducting on approximately one-half the initial current into a particular geological formation as described below.

One embodiment of the invention described in Ser. No. 07/089,697 {Vail(542)} provides a preferred method of operation for the above apparatus as follows: "The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amp o-peak to 30 amps o-peak at a frequency of typically 1 Hz are introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Figure 2:
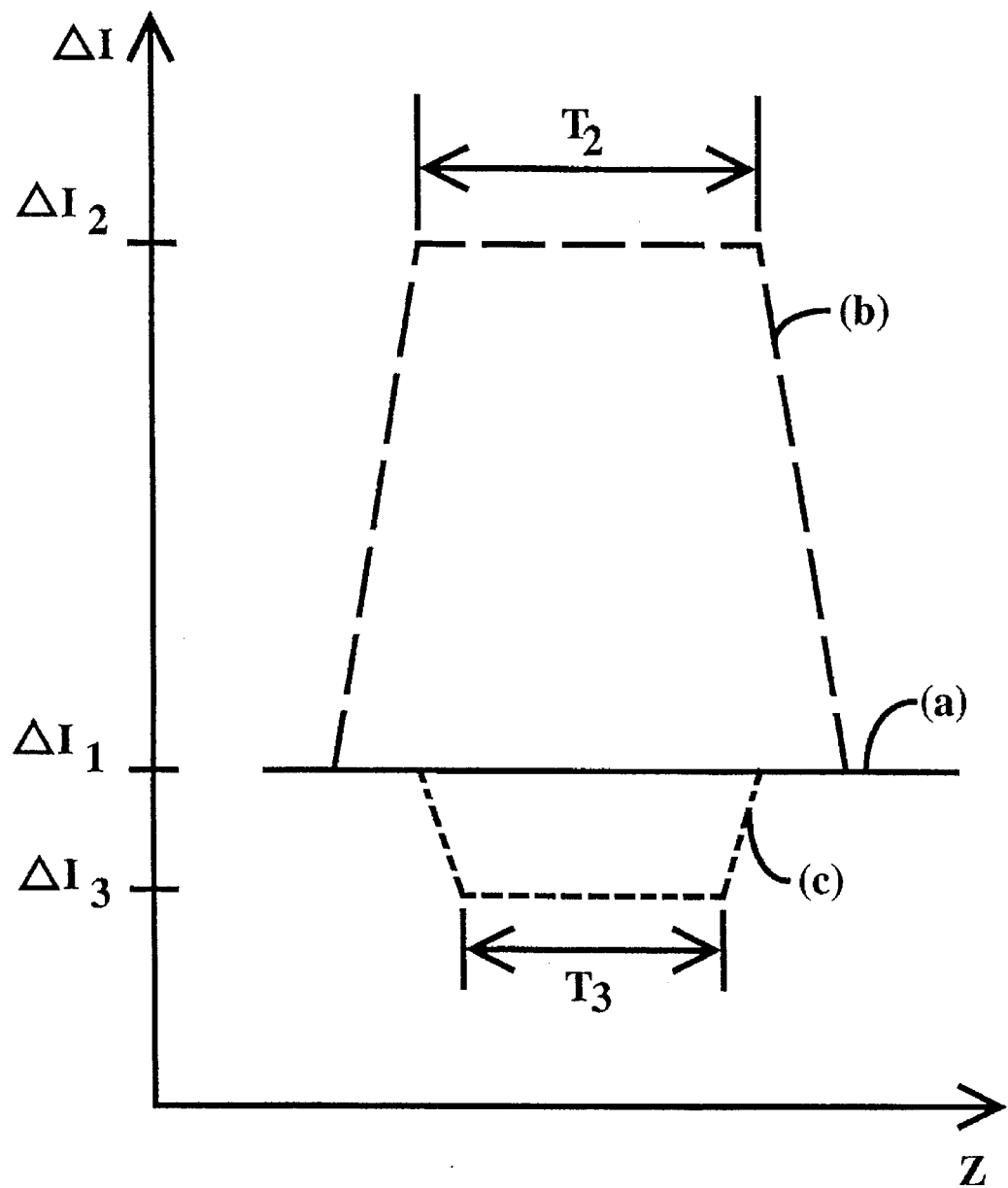
FIG. 2 shows $\Delta I$ vs. Z which diagrammatically depicts the response of the tool to different formations which is marked with the legend "Prior Art".

Quoting further from Ser. No. 07/089,697 {Vail(542)}: "FIG. 2 shows the differential current conducted into formation $\Delta I$ for different vertical positions z within a steel cased borehole. Z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as $\Delta I$ in FIG. 1 which are inversely proportional to the resistivity of the formation. Therefore, one may expect discontinuous changes in the current $\Delta I$ at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
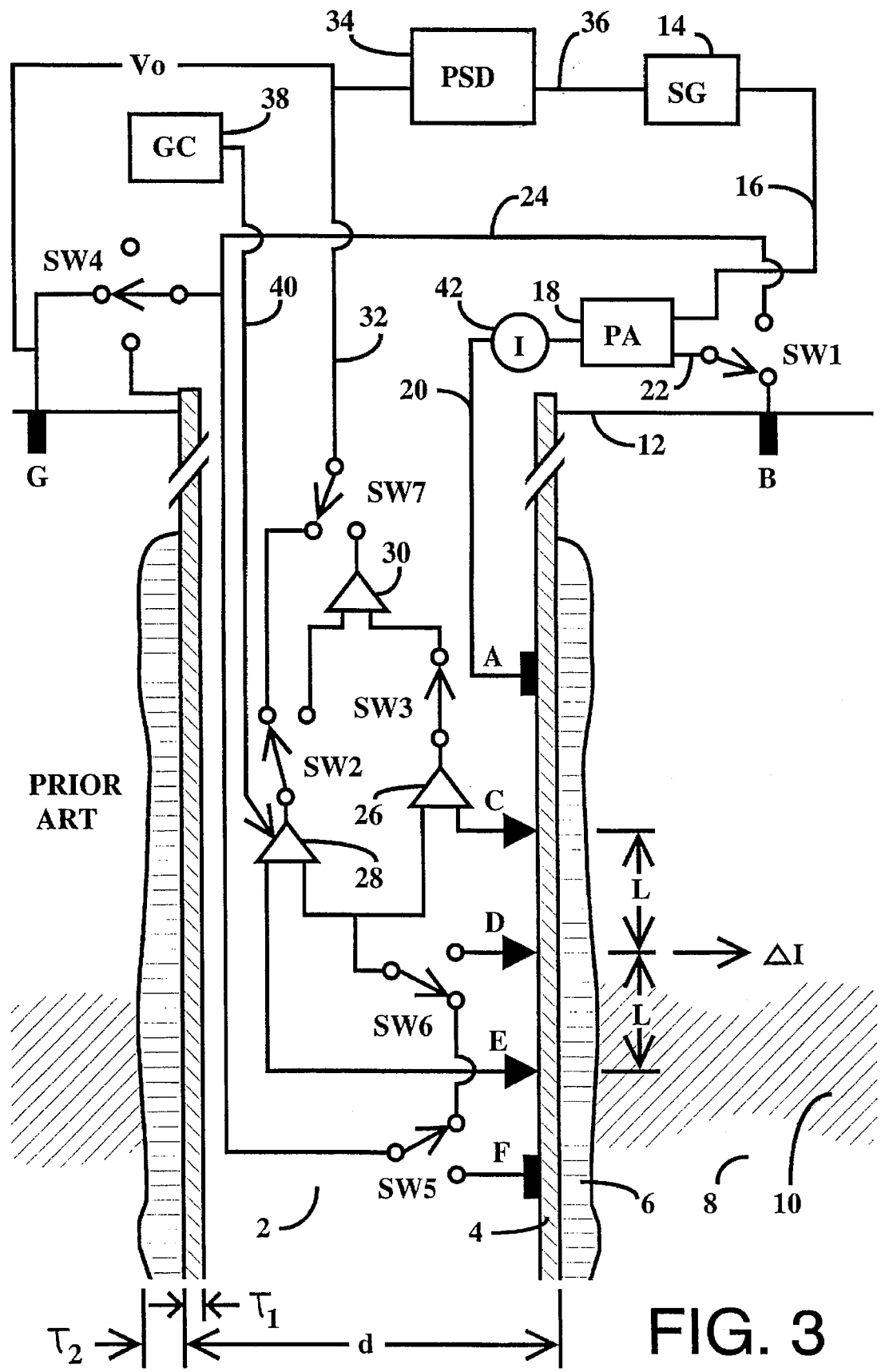
FIG. 3 is a sectional view of a preferred embodiment of the invention which shows how $V_o$ is to be measured that is marked with the legend "Prior Art".

FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth . . . ".

Quoting further from Ser. No. 07/089,697 {Vail(542)}: "For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. An example of an electronics difference means is the combination of amplifiers 26, 28, and 30. The differential current conducted into the formation to be measured is $\Delta I$." The differential voltage is that voltage in FIG. 1 which is the output of amplifier 30 with SW1 connected to electrode B and with all the other switches in the positions shown.

Figure 4:
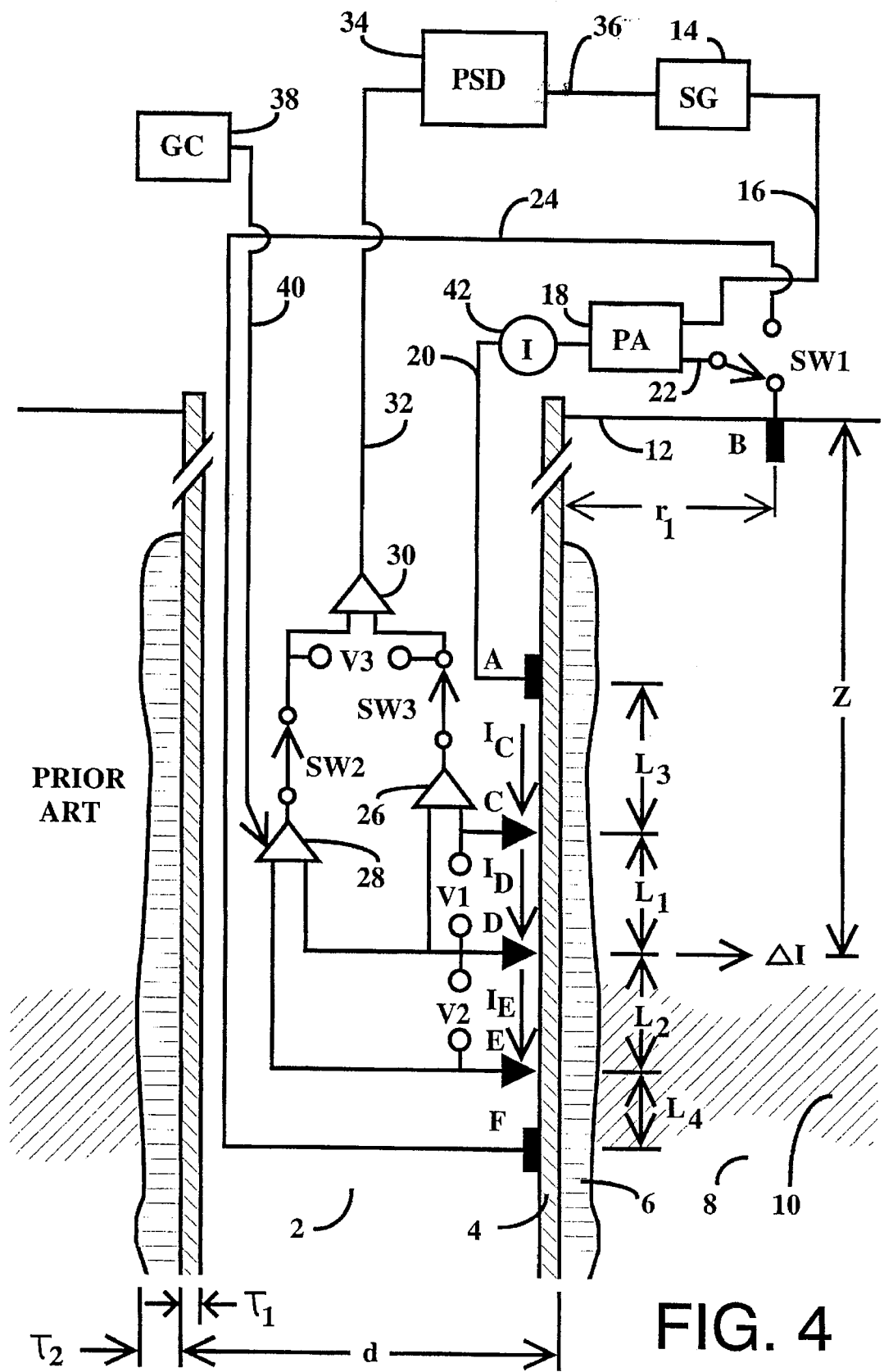
FIG. 4 is a sectional view of an embodiment of the invention which has voltage measurement electrodes which are separated by different distances that is marked with the legend "Prior Art".
Figure 5:
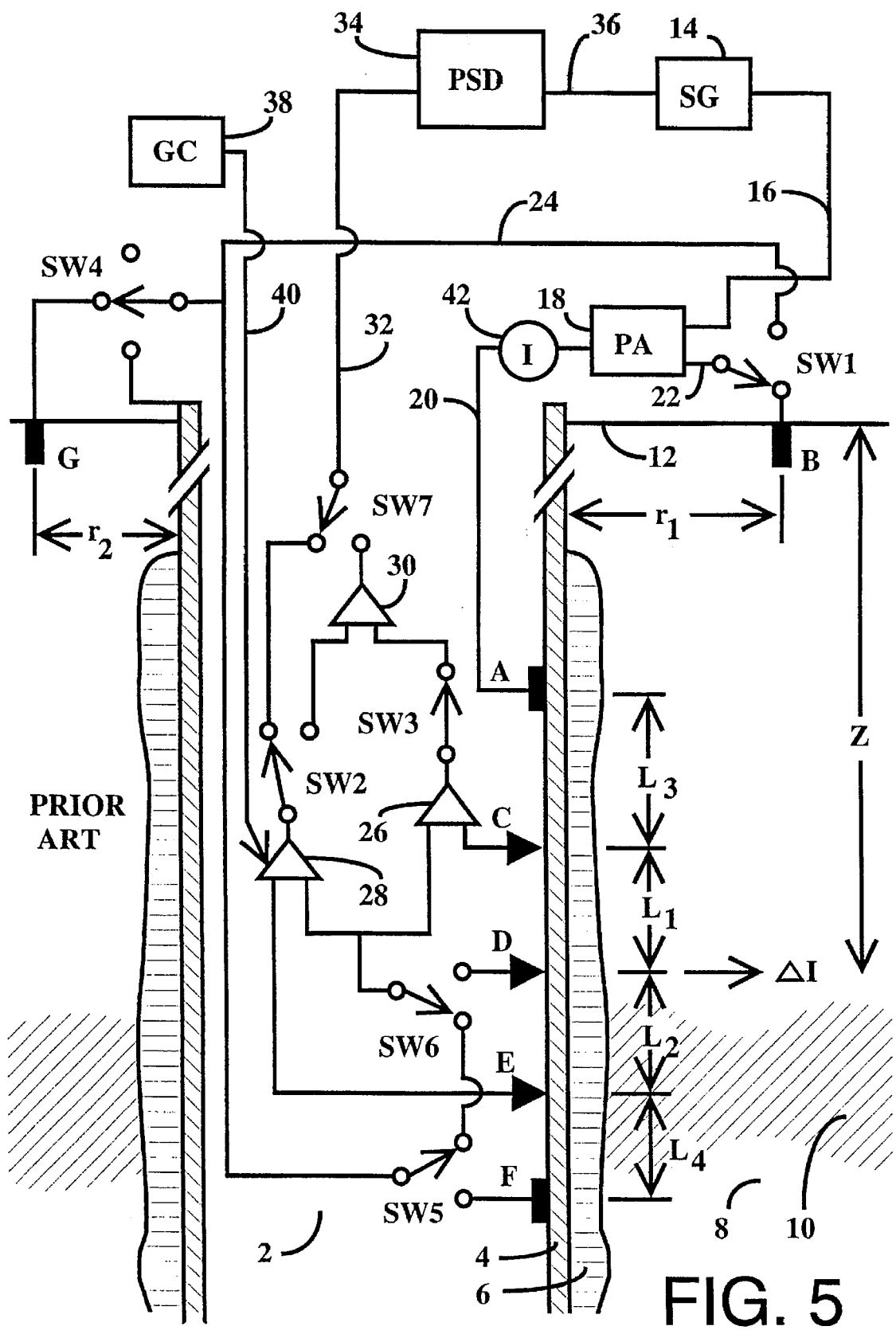
FIG. 5 is a sectional view of an embodiment of the invention which has electrodes which are separated by different distances and which shows explicitly how to measure $V_o$ that is marked with the legend "Prior Art".

Further quoting from Ser. No. 07/089,697 {Vail(542)}: "FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And Z is the depth from the surface of the earth to electrode D. FIG. 5 is nearly identical to FIG. 3 except here too the distances $L_1$, $L_2$, $L_3$, $L_4$, $r_1$, and Z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

Figure 6:
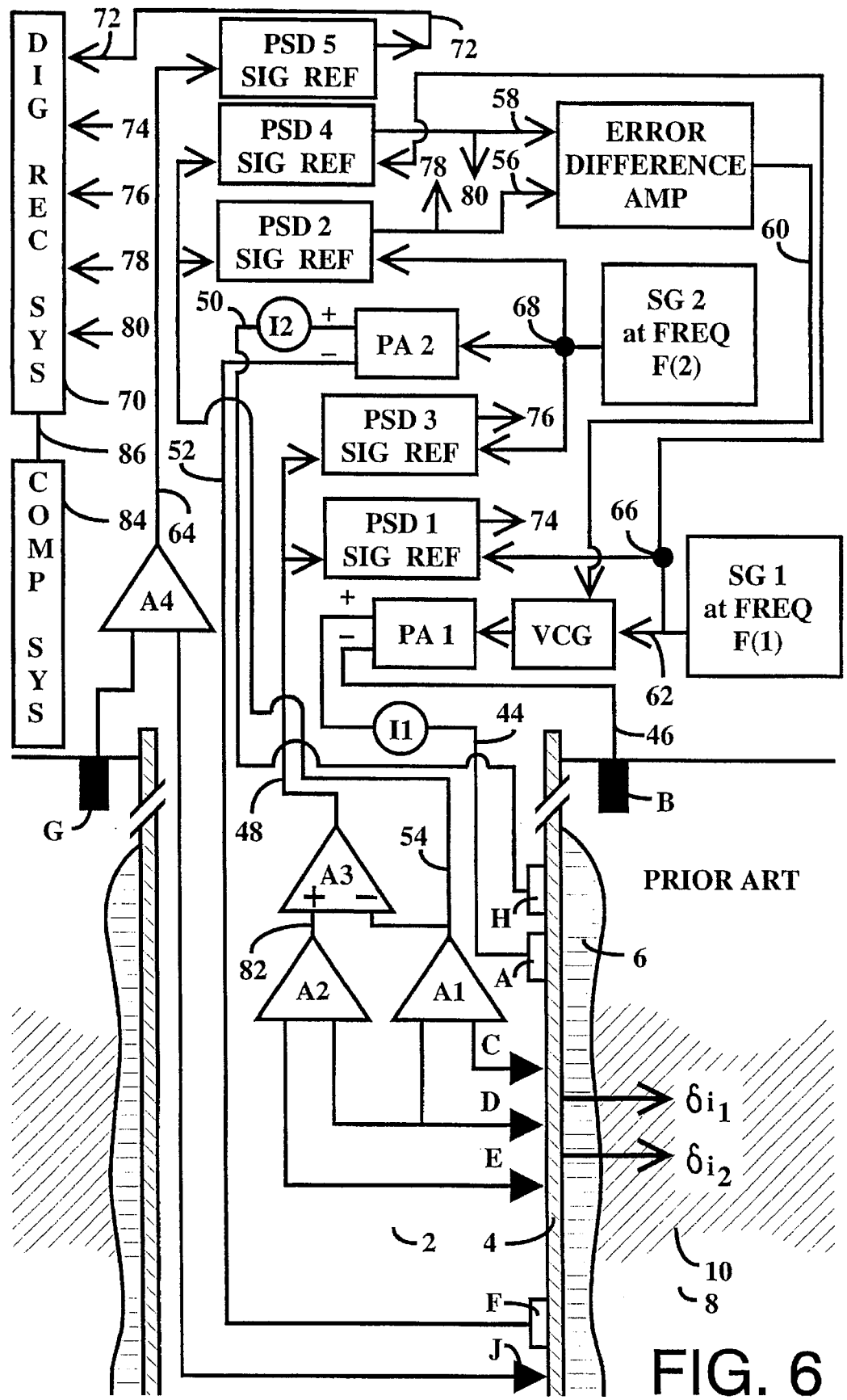
FIG. 6 is a sectional view of an embodiment of the invention which provides multi-frequency operation to compensate for errors of measurement marked with the legend "Prior Art".

FIG. 6 was first described in Ser. No. 07/434,886 {Vail (626)} which states: "For the purpose of logical introduction, the elements in FIG. 6 are first briefly compared to those in FIGS. 1–5. Elements No. 2, 4, 6, 8, and 10 have already been defined. Electrodes A, B, C, D, E, F, G and the distances $L_1$, $L_2$, $L_3$, and $L_4$ have already been described. The quantities $\delta i_1$ and $\delta i_2$ have already been defined in the above text. Amplifiers labeled with legends A1, A2, and A3 are analogous respectively to amplifiers 26, 28, and 30 defined in FIGS. 1, 3, 4, and 5. In addition, the apparatus in FIG. 6 provides for the following:

(a) two signal generators labeled with legends "SG 1 at Freq F(1)" and "SG 2 at Freq F(2)";

(b) two power amplifiers labeled with legends "PA 1" and "PA 2";

(c) a total of 5 phase sensitive detectors defined as "PSD 1", "PSD 2", "PSD 3", "PSD 4", and "PSD 5", which respectively have inputs for measurement labeled as "SIG", which have inputs for reference signals labeled as "REF", which have outputs defined by lines having arrows pointing away from the respective units, and which are capable of rejecting all signal voltages at frequencies which are not equal to that provided by the respective reference signals;

(d) an "Error Difference Amp" so labeled with this legend in FIG. 6;

(e) an instrument which controls gain with voltage, typically called a "voltage controlled gain", which is labeled with legend "VCG";

(f) an additional current conducting electrode labeled with legend "H" (which is a distance $L_5$—not shown—above electrode A);

(g) an additional voltage measuring electrode labeled with legend J (which is a distance $L_6$—not shown—below electrode F);

(h) current measurement devices, or meters, labeled with legends "I1" and "I2";

(i) and differential voltage amplifier labeled with legend "A4" in FIG. 6."

Ser. No. 07/434,886 {Vail(626)} further describes various cables labeled with legends respectively 44, 46, 48, 50, 52, 54, 56, 58, 60, 62, and 64 whose functions are evident from FIG. 6.

Ser. No. 07/434,886 {Vail(626)} further states: "The outputs of PSD 1, 2, 3, and 4 are recorded on a digital recording system 70 labeled with legend "DIG REC SYS". The respective outputs of the phase sensitive detectors are connected to the respective inputs of the digital recording system in FIG. 6 according to the legends labeled with numbers 72, 74, 76, 78, and 80. One such connection is expressly shown in the case of element no. 72."

Ser. No. 07/434,886 {Vail(626)} teaches in great detail that it is necessary to accurately measure directly, or indirectly, the resistance between electrodes C-D (herein defined as "R1") and the resistance between electrodes D-E (herein defined as "R2") in FIGS. 1, 3, 4, 5 and 6 to precisely measure current leakage into formation and formation resistivity from within the cased well. Please refer to Equations 1–33 in Ser. No. 07/434,886 {Vail(626)} for a thorough explanation of this fact. The parent application, Ser. No. 06/927,115 {Vail(989)} and the following Continuation-in-Part Application Ser. No. 07/089,697 {Vail(542)} taught that measurement of the resistance of the casing between voltage measurement electrodes that engage the interior of the casing are very important to measure formation resistivity from within the casing.

Using various different experimental techniques that result in current flow along the casing between current conducting electrodes A and F in FIGS. 1, 3, 4, 5, and 6 result in obtaining first compensation information related to a first casing resistance defined between voltage measurement electrodes C and D. Similarly, using various different experimental techniques that result in current flow along the casing between current conducting electrodes A and F in FIGS. 1, 3, 4, 5, and 6 result in obtaining second compensation information related to a second casing resistance between voltage measurement electrodes D and E. FIGS. 1, 3, 4, 5, and 6 all provide additional means to cause current to flow into formation, and the measurements performed while current is flowing into the formation is called the measurement information related to current flow into formation. Such measurement information is used to determine a magnitude relating to formation resistivity. Various other figures in the Vail Patents provide means to provide measurement information, and respectively first and second compensation information, along with additional information in several cases.

It should also be noted that Ser. No. 07/089,697 {Vail (542)} describes many different means to measure voltage profiles on the casing including those shown in FIG. 25, 26, 27, 28, and 29 therein. Those drawings describe several other apparatus geometries having multiple electrodes.

Figure 7:
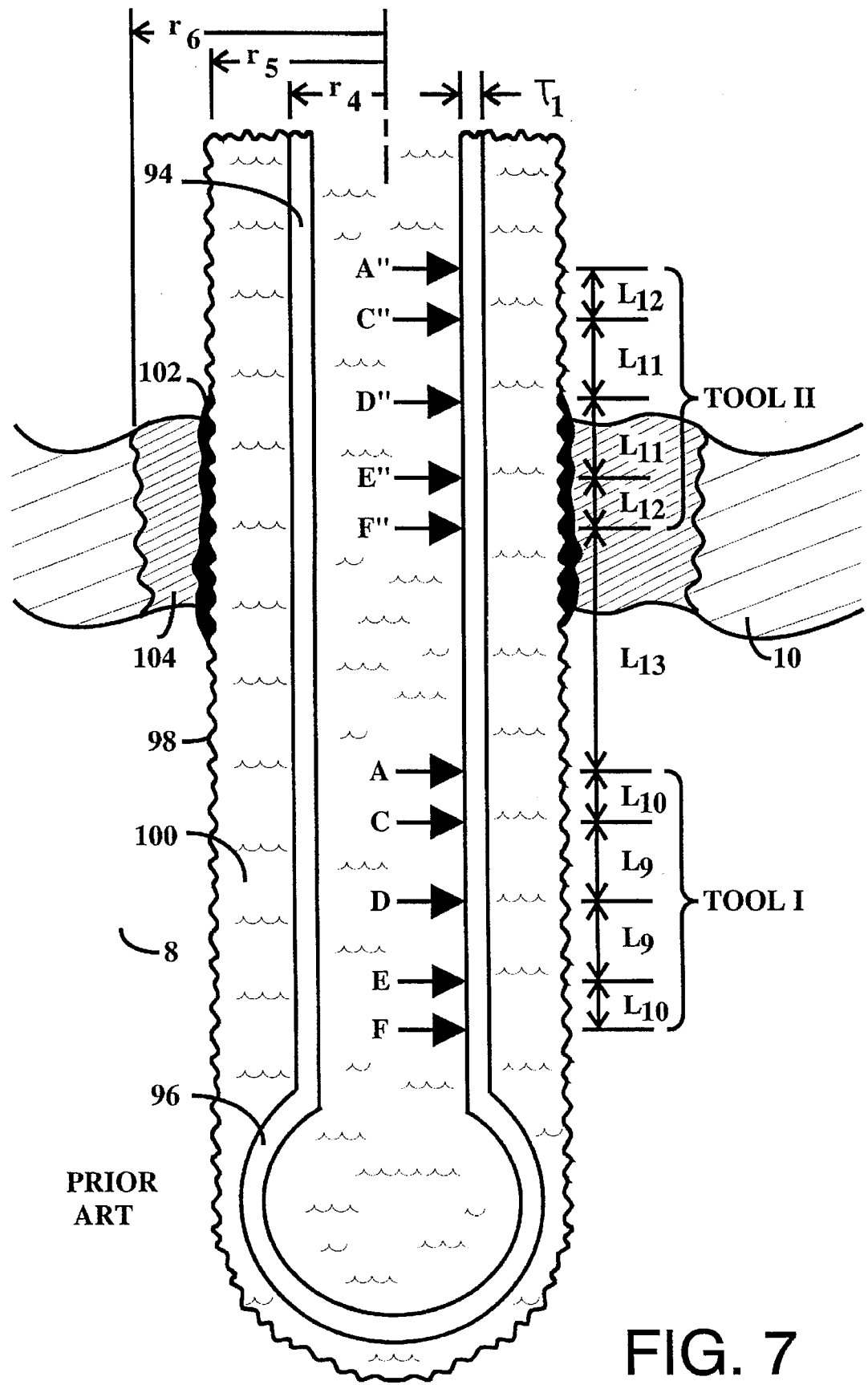
FIG. 7 shows a sectional view of the invention used to measure formation properties from within a drill string that is marked with the legend "Prior Art".

Quoting further from Ser. No. 07/089,697 {Vail(542)} in relation to FIG. 7 herein that is Prior Art, and that is equivalent to FIG. 48 in Vail(542), page 30, lines 41–66: "A drill stem 94 used to turn a drilling bit 96 has drilled an open-hole 98 through the geological formation 8 and through oil bearing formation 10. As is usually the case, drilling fluids 100 fill the open borehole. And is typically the case in porous regions such as in oil bearing formations, a "cake" 102 forms on the wall of the open borehole due to the invasion of fluids into the formation. The "invaded zone" of the formation is labeled as 104. The radius of the drill string is $r_4$, the thickness of the drill string pipe is $\tau_1$, the radius of the open hole at any given vertical position is $r_5$, and the radius of the invasion zone at any vertical position is $r_6$. Two individual Thru Casing Resistivity Tool apparatus are lowered into the inside of the drill stem while the drilling bit is stopped which are labeled Tool I and Tool II in FIG. 48. Tool I has electrodes A, C, D, E, and F which are defined functionally in FIG. 1. Electrodes C and D, and D and E are separated by the distance $L_9$. The distance $L_{10}$ separates electrodes A and C and electrodes E and F." Measurements are performed with the apparatus as defined conceptually in FIGS. 1 and 3. Quoting further from Ser. No. 07/089,697 {Vail(542)}: "In addition, another independent tool, labeled Tool II, is mechanically connected to Tool I and has electrodes A", C", D", E", and F". The distances $L_{11}$, $L_{12}$, and $L_{13}$ are defined in FIG. 7.

Various embodiments of the inventions in the Vail Patents provide many different manners to introduce current onto the casing, a portion of which is subsequently conducted through formation. Various embodiments in the Vail Patents provide many different methods to measure voltage levels at a plurality of many points on the casing to provide a potential voltage profile along the casing which may be interpreted to measure the current leaking off the exterior of the casing from within a finite vertical section of the casing. Regardless of the details of operation chosen however, many embodiments disclosed in the Vail Patents provide a minimum of 3 spaced apart voltage measurement electrode means that provides measurement information related to current flow into the geological formation, and respectively, first and second compensation information related to measurements of at least two separate casing resistances between the three spaced apart voltage measurement electrodes, wherein the measurement information and the first and second compensation information are used to determine a magnitude related to formation resistivity.

Cased wells used to produce oil and gas are installed into the earth using methods typically employed in the oil and gas industries. For example, for a description of typical well installation procedures, please refer to the "ROTARY DRILLING SERIES" published by the Petroleum Extension Service of the Division of Continuing Education, The University of Texas at Austin, Austin, Tex., in cooperation with the International Association of Drilling Contractors, Houston, Tex. comprising the following basic "Units", each having individual "Lessons": "Unit I: The Rig and its Maintenance", Third Edition, which includes the following individual lessons—"Lesson 1: The Rotary Rig and Its Components", "Lesson 2: The Bit", "Lesson 3: The Drill Stem", "Lesson 4: Rotary, Kelly, and Swivel", "Lesson 5: The Blocks and Drilling Line", "Lesson 6: The Hoist", "Lesson 7: Power and Power Transmission", "Lesson 8: Circulating Systems", "Lesson 9: The Auxiliaries", "Lesson 10: Safety on the Rig", "Lesson 11: Diesel Engines and Electric Power"; and "Lesson 12: Mud Pumps and Conditioning Equipment"; "Unit II: Normal Drilling Operations", Second Edition, which includes the following individual lessons—"Lesson 1: Making Hole", "Lesson 2: Drilling Mud", "Lesson 3: Drilling a Straight Hole"; "Lesson 4: Casing and Cementing"; and "Lesson 5: Testing and Completing"; "Unit III: Nonroutine Rig Operations", Third Edition, which includes the following individual lessons— "Lesson 1: Controlled Directional Drilling"; "Lesson 2: Open-Hole Fishing"; "Lesson 3: Blowout Prevention"; and "Lesson 4: Subsea Blowout Preventers and Marine Riser Systems"; "Unit IV: Man Management and Rig Management"; and "Unit V: Offshore Technology" which includes the following individual lessons—"Lesson 1: Wind, Waves, and Weather", "Lesson 2: Spread Mooring Systems"; "Lesson 3: Buoyancy, Stability, and Trim", "Lesson 4: Jacking Systems and Rig Moving Procedures", "Lesson 5: Diving Equipment", "Lesson 6: Vessel Maintenance and Inspection", "Lesson 7: Helicopter Safety and Survival Procedures", "Lesson 8: Orientation for Offshore Crane Operation" and "Lesson 9: Life Offshore".

In the first of the above series, "The Rotary Rig and Its Components", in the Glossary, on page 30 it states: "casing n: steel pipe placed in an oil or gas well as drilling progresses to prevent the wall of the hole from caving in during drilling and to provide a means of extracting petroleum if the well is productive". In that same reference, "The Rotary Rig and Its Components", in the Glossary, on page 32 it further states: "drill string n: the column, or string, of drill pipe with attached tool joints that transmits fluid and rotational power from the kelly to the drill collars and bit. Often, especially in the oil patch, the term is loosely applied to include both drill pipe and drill collars. Compare drill stem." In that same reference, "The Rotary Rig and Its Components", in the Glossary, on page 32 it further states: "drill stem n: all members in the assembly used for drilling by the rotary method from the swivel to the bit, including the kelly, drill pipe and tool joints, drill collars, stabilizers and various subsequent items. Compare drill string." Many figures, diagrams photographs, and other information concerning the drill string and the drill stem are included in the Unit I, Lesson 3, entitled "The Drill Stem". Many figures, diagrams, photographs, and other information concerning types of casings are included in Unit II, Lesson 4, entitled "Casing and Cementing". These references describe in detail that, initially, a hole is drilled into the earth using a drilling bit attached to a "drill string". A drill string is normally steel pipe that is particularly adapted to drilling wells. After the "open-hole" is drilled, then "open-hole logging tools" are typically inserted into the well that perform measurements in that open-hole. For example, for a listing of such open-hole tools, please refer to "Wireline Logging Tool Catalog, BPB, Dresser Atlas, Gearhart, Geoservices, Micro Log, Prakla, Schlumberger, Welex", Edited by Maurice Verdier, Gulf Publishing Company, Houston, Tex., Second Edition, 1986. That catalog separately lists the many tools available in the industry. That catalogue does show many devices from many manufacturers which measure formation resistivity in open-holes, but does not show any device from any manufacturer that measures formation resistivity from within cased wells.

There are many standard texts that show how to process the information obtained from the open-hole logging tools to determine the amount of oil and gas present. The information is typically processed using algebraic analysis that is usually based upon the use of Archie's Equations. For example, please refer to "Essentials of Modern Open-Hole Log Interpretation" by John T. Dewan, PennWell Publishing Company, Tulsa, Okla., 1983 that is called "Reference 1" for brevity. Reference 1 calls Archie's Equations instead "Archie's Relations" or the "Archie Relations", which is also called "Archie's Equation" in yet other references, those four terms being used interchangeably in the industry. Reference 1 defines the Archie Relations on page 34, a portion of which is substantially repeated below as follows:

"ARCHIE RELATIONS FOR WATER SATURATION

General: $S_w = c (R_w/R_t)^{1/2}/\Phi$ $R_t$=deep resistivity, ohm-m $R_w$=interstitial water resistivity, ohm-m $\Phi$=porosity, fraction c=1.0 for carbonates, 0.9 for sands"

The variables $S_w$, $R_t$, $R_w$, and $\phi$ shall be briefly described in the following.

On page 6 of Reference 1, it further states: "The fraction of pore space containing water is termed water saturation, denoted $S_w$. The remaining fraction containing oil or gas is termed hydrocarbon saturation, $S_h$, which of course, equals ($1-S_w$). For the purposes herein, $S_h$ shall mean "the total combined amount of oil and gas present in the geological formation".

On page 20 of Reference 1, it succinctly states the definition of $R_t$ as follows: ". . . $R_t$, the resistivity of the oil-bearing formation." $R_t$ is the true, or total, formation resistivity, and the quote in the previous sentence from Reference 1 should have instead said the "potentially" oil-bearing formation because not all formations have oil. For the purposes of this invention, $R_t$ shall mean the "total resistivity of the geological formation" or equivalently, it shall mean the "true resistivity of the geological formation".

On page 18 of Reference 1, it succinctly states the definition of $R_w$ as follows: ". . . $R_w$, the resistivity of the formation water." For the purposes of this invention, the phrase "to determine the salinity of any salt water present" shall also equivalently mean "to determine the resistivity of the formation water" defined in the previous sentence, because it is generally known in the field that the salinity of water determines the resistivity of the formation water that as is clearly shown on pages 4 and 5 of the work entitled "Schlumberger, Log Interpretation Charts", Schlumberger Educational Services, 1991.

On page 5 of Reference 1, it states: "Porosity, denoted as $\phi$, is the fraction of the total volume that is pore space." Therefore, all of the variables appearing the above defined "ARCHIE RELATIONS FOR WATER SATURATION" have now been explicitly defined."

Other algebraic equations are sometimes used other than the above defined "ARCHIE RELATIONS FOR WATER SATURATION", but they are also examples of open-hole algebraic analysis. The process of quantitatively obtaining the amount of oil and gas present from measurements obtained from open-hole logging tools is herein called "Open-Hole Methods of Measurement".

Typical steps used in Open-Hole Methods of Measurement are as follows:

Step A. Measure information to determine the porosity of the rock adjacent to the open-hole using various types of nuclear, gamma ray, nuclear magnetic resonance, or acoustic open-hole logging tools.

Step B. Measure information to determine the salinity of any salt water adjacent to the open-hole using a variety of techniques including the use of certain types of nuclear tools, or empirical analysis involving assumptions of nearby 100% water bearing formations.

Step C. Measure information to determine the resistivity of the rock adjacent to the open-hole.

Step D. Determine the combined amount of oil and gas present adjacent the open-hole from measurements performed in Steps A, B, and C using standard geophysical algebraic analysis that is based upon the use of Archie's Equations and other standard open-hole analysis.

Step E. Measure information used to determine the relative amounts of oil and gas present using various types of open-hole nuclear and other tools.

Step F. From Steps D and E, quantitatively calculate the actual amount of oil and gas present adjacent the open-hole.

After the amount of oil and gas present is determined using Open-Hole Methods of Measurement, then a decision is reached concerning whether producible amounts of oil and gas are present. If producible amounts are present, then normally the well is lined with steel pipe to prevent the formations from collapsing into the well. In many situations, the steel pipe is cemented into the formations to prevent vertical communication between various formation waters, oil, and gas. The steel pipe that is typically cemented into the formation is called "casing" and the well becomes a "cased well". Various explosive means in the industry are used to perforate the casing. Oil, gas, or water may flow through the perforations into the cased well. Typically, a bridge plug is installed below the perforations in the well. Tubing is normally installed into the well above the perforations to carry the oil, gas, and water to the surface. The previously mentioned "ROTARY DRILLING SERIES" provides many drawings and details concerning standard well installation procedure.

It has heretofore been impossible before the advent of the Through Casing Resistivity Tool to measure formation resistivity from inside cased wells. Therefore, the method to determine the amount of oil and gas comprising Steps A, B, C, D, E and F have heretofore not worked from within steel pipes because Step C in particular was heretofore impossible to do from within the steel pipes.

It is known to various experts in the logging industry that measurements corresponding to Steps A, B, and E can be performed from within steel cased wells. Such measurements are performed with "cased-hole logging tools" that are able to perform measurements through casing or other steel pipe present. However, because it was heretofore not possible to measure the resistivity of geological formations from within cased wells before the invention defined in the Vail Patents, Step C prevented the use of the Steps A, B, C, D, E, and F to determine the amount of oil and gas in a formation adjacent to a steel pipe.

It is now appropriate to review several particular measurements which may be performed from within casing. An excellent review of such measurements that can be performed with such cased-hole logging tools (that was current in 1989) is provided by the reference entitled "Schlumberger, Cased Hole Log Interpretation, Principles/ Applications", Schlumberger Educational Services, P.O. Box 2175, Houston, Tex. 77252-2175 that is hereinafter defined as "Reference 2" for brevity. A copy of Reference 2 is included herein by reference. Chapter 2 of Reference 2 reviews the "Fundamentals of Quantitative Log Interpretation" that provides rigorous definitions of porosity, water saturation, and other relevant terms.

Various cased-hole measurements are succinctly reviewed on page 3-1 of Reference 2 which begins with the following quote: "Cased hole logs for formation evaluation are principally those from the radiation-measuring tools; e.g., the Thermal Decay Time (TDT), Gamma Ray Spectrometry (GST), Compensated Neutron (CNL), standard gamma ray (GR), and Natural Gamma Ray Spectrometry (NGS*) tools. In addition the Array-Sonic* or Long-Spaced Sonic (LSS*) tools provide porosity data in well-cemented casings and the density log is also useful in special cases." According to the cover page of this reference "An asterisk (*) is used . . . to denote a mark of Schlumberger."

On page 3-1 of Reference 2, it states: "In well-bonded casing the Array-Sonic log provides formation compressional and shear travel times for porosity information and data from mechanical rock property calculations." Therefore, the Array-Sonic tool is one particular example of a cased-hole logging tool that obtains information from within a cased well to determine the porosity of the geological formation (that corresponds to an example of Step 1 below).

On page 3-1 of Reference 2, it further states: "The TDT log provides water saturation through discrimination between saline water and hydrocarbon. Additional measurements also provide information for calculating apparent porosity and apparent formation water salinity." Therefore, the TDT tool is one particular example of a cased-hole logging tool that obtains information from within a cased well to determine the salinity of any salt water present in the geological formation (that corresponds to an example of Step 2 below). It is evident that the TDT tool is primarily sensitive to water salinity because on page 3-17 of Reference 2 it states: "Because chlorine is by far the strongest neutron absorber of the common earth elements,, the response of the TDT log is determined primarily by the chlorine present (as sodium chloride) in the formation water."

On page 3-1 of Reference 2, it further states: "The CNL neutron log provides a porosity index which depends primarily on the hydrogen content of the formation. When cementation conditions permit, the Array-Sonic log combined with the CNL log can be used to detect gas zones through casing." Therefore, the CNL tool is one particular example of a cased-hole logging tool that obtains information from within a cased well to determine the relative amount of oil and gas present in the geological formation (that corresponds to an example of Step 5 below). The relative amount of oil and gas are automatically provided by CNL measurements because the porosity index depends upon "hydrogen content of the formation" as quoted from the previous sentence, and oil is much denser than gas. Put another way, $S_h$, the hydrocarbon saturation, was defined above in this invention as the "total combined amount of oil and gas present". As is well known to industry experts, at a given depth within the well, either oil or gas is typically present. By determining the "relative amount of oil and gas present", which is typically either 100% oil and 0% gas, or 0% oil and 100% gas, then the "amount of oil present" and the "amount of gas present" can be separately determined. As an example, for 100% oil present, $S_h$ would be the total amount of oil present. For 100% gas present, $S_h$ would instead be the total amount of gas present. For mixed oil and gas situations, if the ratio of the amount of oil to the amount of gas present is determined, otherwise called "the relative amount of oil and gas present", then the amount of oil present and the amount of gas present can be separately determined.

On page 3-1 of Reference 2, it further states: "The standard gamma ray log is the basic log used for correlation and gives lithology control; in particular it provides an estimate of shaliness." It is also evident to industry experts that the measurements quoted on page 3-1 of Reference 2 can be used in different combinations to obtain information concerning the porosity, water salinity, and relative amounts of oil and gas that are relevant to Steps 1, 2 and 5 below. For example, there are ways to use the measurements recited on page 3-1 to obtain porosity and water salinity when the cement is not well bonded to the casing (from TDT measurements).

Page 3-1 of Reference 2 also describes measurements from the NGS tool, the GST tool, the LLS tool, and the density tool and they can be used separately in yet different combinations to obtain relevant information concerning Steps 1, 2, and 5 below. In addition, advances have occurred since 1989 to make the above analysis described from Reference 2 more generally available under progressively more complex circumstances although it is not necessary to recite those advances here. And finally, there are other cased-hole tools provided by other manufacturers, such as Western Atlas Logging Services, that provide similar information to that provided by tools manufactured by Schlumberger.

Consequently, there are many ways to obtain measurement information related to Steps 1, 2 and 5 below.

However, before the applicant's invention, it was heretofore impossible to measure formation resistivity from within cased wells (Step 3 below). Please notice that Reference 2 does NOT describe methods to measure formation resistivity from within cased wells.

Therefore, an embodiment of the invention herein comprises the following steps to determine the amount of oil and gas from within a steel pipe located in the earth (or from within a cased well):

Step 1: Measure information from within the steel pipe present to determine the porosity of the adjacent rock using various types of nuclear, gamma ray, or acoustic cased-hole logging tools.

Step 2. Measure information from within the steel pipe present to determine the salinity of any salt water adjacent to the steel pipe using a variety of techniques including the use of certain types of cased-hole nuclear tools, or empirically determine the salinity of the water present using geophysical analysis involving assumptions of nearby 100% water bearing formations.

Step 3. Measure information from within the steel pipe present using the Through Casing Resistivity Tool to determine the resistivity of the rock adjacent to the steel pipe.

Step 4. Determine the combined amount of oil and gas present from measurements performed within the steel pipe present in Steps 1, 2, and 3 using standard geophysical algebraic analysis that is based upon the use of Archie's Equations and other standard open-hole analysis.

Step 5. Measure information used to determine the relative amounts of oil and gas present adjacent to the steel pipe using various types of cased-hole nuclear and other cased-hole tools.

Step 6. From Steps 4 and 5, quantitatively calculate the actual amount of oil and gas present from measurements obtained from within the steel pipe present.

Here, the "steel pipe" may be any one among the following:

(a) typical steel casing used to complete wells;

(b) a standard drill string attached to a drilling bit;

(c) any type of steel or metal pipe that is attached to a drilling bit; and (d) any type of electrically conductive pipe that is attached to a drilling bit.

A preferred embodiment of the invention herein is the method of measurement defined by Steps 1, 2, 3, 4, 5, and 6 above.

Another preferred embodiment of the invention herein is the method to determine the combined amount of oil and gas present adjacent to a steel pipe in part comprising the steps of measuring the porosity, determining the water salinity, measuring the resistivity of the rock present.

Another preferred embodiment of the invention herein is the method to determine the quantitative amount of oil and gas present adjacent to cased wells by obtaining the combined amount of oil and gas present, determining the relative amount of oil and gas present from within the steel pipe present, and using that information to determine the separate quantities of oil and gas respectively present.

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. A method to quantitatively determine the combined amount of oil and gas adjacent to a steel pipe in a geological formation characterized by having a resistivity, a porosity, and a salinity of salt water present comprising the steps of using information obtained from measurements of the resistivity of the geological formation that are obtained from within a steel pipe located in said geological formation in combination with using information obtained from measurement from within the steel pipe of the porosity of the formation and using information obtained from the measurement from within the steel pipe of the salinity of any salt water present in the formation as steps in a process to quantitatively determine the combined amount of oil and gas present adjacent to said steel pipe in the geological formation.

2. A method, as claimed in claim 1, wherein the steel pipe is a typical steel casing used to complete wells.

3. A method, as claimed in claim 1, wherein the steel pipe is a standard drill string attached to a drilling bit.

4. A method, as claimed in claim 1, wherein the steel pipe is any type of electrically conductive pipe attached to a drilling bit.

5. The method to determine the amount of oil present in a particular geological formation characterized as having a porosity, a salinity of any salt water present, a total resistivity, and a relative amount of oil and gas present, said geological formation being adjacent to a cased well, comprising the steps of:
 (a) obtain information from within the cased well to determine the porosity of the geological formation; and
 (b) obtain information from within the cased well to determine the salinity of any salt water present in the geological formation; and
 (c) obtain information from within the cased well to determine the total resistivity of the geological formation; and
 (d) use said porosity, water salinity, and total resistivity information in Archie's Equations to determine the total combined amount of oil and gas present in the geological formation; and
 (e) obtain information from within the cased well to determine the relative amount of oil and gas present in the geological formation; and
 (f) use said total combined amount of oil and gas present and said relative amount of oil and gas present to quantitatively determine the amount of oil in said geological formation.

6. The method to determine the amount of gas present in a particular geological formation characterized as having a porosity, a salinity of any salt water present, a total resistivity, and a relative amount of oil and gas present, said geological formation being adjacent to a cased well, comprising the steps of:
 (a) obtain information from within the cased well to determine the porosity of the geological formation; and
 (b) obtain information from within the cased well to determine the salinity of any salt water present in the geological formation; and
 (c) obtain information from within the cased well to determine the total resistivity of the geological formation; and
 (d) use said porosity, water salinity, and total resistivity information in Archie's Equations to determine the total combined amount of oil and gas present in the geological formation; and
 (e) obtain information from within the cased well to determine the relative amount of oil and gas present in the geological formation; and
 (f) use said total combined amount of oil and gas present and said relative amount of oil and gas present to quantitatively determine the amount of gas in said geological formation.

7. The method to determine the amount of oil present in a particular geological formation characterized as having a porosity, a salinity of any salt water present, a total resistivity, and a relative amount of oil and gas present, said geological formation being adjacent to a cased well, comprising the steps of:
 (a) determine the porosity of the geological formation; and
 (b) determine the salinity of any salt water present in the geological formation; and
 (c) obtain information from within the cased well to determine the total resistivity of the geological formation; and
 (d) use said porosity, water salinity, and total resistivity information in Archie's Equations to determine the total combined amount of oil and gas present in the geological formation; and
 (e) obtain information from within the cased well to determine the relative amount of oil and gas present in the geological formation; and
 (f) use said total combined amount of oil and gas present and said relative amount of oil and gas present to quantitatively determine the amount of oil in said geological formation.

8. The method to determine the amount of gas present in a particular geological formation characterized as having a porosity, a salinity of any salt water present, a total resistivity, and a relative amount of oil and gas present, said geological formation being adjacent to a cased well, comprising the steps of:
 (a) determine the porosity of the geological formation; and
 (b) determine the salinity of any salt water present in the geological formation; and
 (c) obtain information from within the cased well to determine the total resistivity of the geological formation; and
 (d) use said porosity, water salinity, and total resistivity information in Archie's Equations to determine the total combined amount of oil and gas present in the geological formation; and
 (e) obtain information from within the cased well to determine the relative amount of oil and gas present in the geological formation; and
 (f) use said total combined amount of oil and gas present and said relative amount of oil and gas present to quantitatively determine the amount of gas in said geological formation.

9. The method to determine the amount of oil present in a particular geological formation characterized as having a porosity, a salinity of any salt water present, a total resistivity, and a relative amount of oil and gas present, said geological formation being adjacent to a cased well, comprising the steps of:
 (a) obtain information from within the cased well to determine the porosity of the geological formation; and
 (b) obtain information from within the cased well to determine the salinity of any salt water present in the geological formation; and (c) obtain information from within the cased well to determine the total resistivity of the geological formation whereby said total resistivity of the geological formation is obtained from within the cased well with an apparatus having at least a first current conducting electrode that is in electrical contact with the interior of the casing and a second current conducting electrode that is in electrical contact with the surface of the earth, said apparatus further having A.C. current generation means to generate and conduct A.C. current between said first and second electrodes of said apparatus, whereby said A.C. current generating means produces A.C. current that has a frequency that is not greater than the frequency of 20 Hz; and (d) use said porosity, water salinity, and total resistivity information in Archie's Equations to determine the total combined amount of oil and gas present in the geological formation; and (e) obtain information from within the cased well to determine the relative amount of oil and gas present in the geological formation; and (f) use said total combined amount of oil and gas present and said relative amount of oil and gas present to quantitatively determine the amount of oil in said geological formation.

10. The method to determine the amount of gas present in a particular geological formation characterized as having a porosity, a salinity of any salt water present, a total resistivity, and a relative amount of oil and gas present, said geological formation being adjacent to a cased well, comprising the steps of:

(a) obtain information from within the cased well to determine the porosity of the geological formation; and (b) obtain information from within the cased well to determine the salinity of any salt water present in the geological formation; and (c) obtain information from within the cased well to determine the total resistivity of the geological formation whereby said total resistivity of the geological formation is obtained from within the cased well with an apparatus having at least a first current conducting electrode that is in electrical contact with the interior of the casing and a second current conducting electrode that is in electrical contact with the surface of the earth, said apparatus further having A.C. current generation means to generate and conduct A.C. current between said first and second electrodes of said apparatus, whereby said A.C. current generating means produces A.C. current that has a frequency that is not greater than the frequency of 20 Hz; and (d) use said porosity, water salinity, and total resistivity information in Archie's Equations to determine the total combined amount of oil and gas present in the geological formation; and (e) obtain information from within the cased well to determine the relative amount of oil and gas present in the geological formation; and (f) use said total combined amount of oil and gas present and said relative amount of oil and gas present to quantitatively determine the amount of gas in said geological formation.

* * * * *